United States Patent
Heath

(10) Patent No.: US 6,890,472 B2
(45) Date of Patent: May 10, 2005

(54) METHOD AND APPARATUS FOR MAKING A BLISTER PACK WITH INDICIA

(75) Inventor: Kenneth Heath, Llanelli (GB)

(73) Assignee: R. P. Scherer Technologies, Inc., Las Vegas, NV (US)

( * ) Notice: Subject to any disclaimer, the term of this patent is extended or adjusted under 35 U.S.C. 154(b) by 354 days.

(21) Appl. No.: 10/298,893

(22) Filed: Nov. 18, 2002

(65) Prior Publication Data

US 2003/0067092 A1 Apr. 10, 2003

Related U.S. Application Data

(63) Continuation of application No. 10/075,824, filed on Feb. 13, 2002, and a continuation of application No. 10/076,038, filed on Feb. 15, 2002, which is a division of application No. 09/549,127, filed on Apr. 13, 2000, now abandoned, which is a continuation-in-part of application No. PCT/GB99/02589, filed on Aug. 6, 1999.

(30) Foreign Application Priority Data

Aug. 14, 1998 (GB) .............................. 9817793

(51) Int. Cl.[7] .......................... B29C 55/02; B29C 59/02
(52) U.S. Cl. ....................... 264/292; 264/293
(58) Field of Search .............................. 264/288.4, 291, 264/292, 293

(56) References Cited

U.S. PATENT DOCUMENTS 5,457,895 A * 10/1995 Thompson et al. ........... 34/296

FOREIGN PATENT DOCUMENTS

| EP | 0563934 A1 | * | 10/1993 |
| EP | 0646367 B1 | * | 5/1997 |
| EP | 0710101 B1 | * | 5/1998 |
| EP | 0905042 A1 | * | 3/1999 |
| WO | WO-9721534 A1 | * | 6/1997 |
| WO | WO-9908857 A1 | * | 2/1999 |
| WO | WO-0009313 A1 | * | 2/2000 |

* cited by examiner

Primary Examiner—Leo B. Tentoni
(74) Attorney, Agent, or Firm—Andrew G. Rozycki; Donald O. Nickey

(57) ABSTRACT

The invention herein relates to a method and apparatus for forming (or cold-forming) an embossed blister from a laminated film wherein an indicia is formed on the base of the blister. In particular, the invention involves a single pass process of combining the formation of a blister and the formation of an indicia (embossing) on the blister, wherein the blister-forming pin contains a face with an indicia and is adapted to controllably stretch the laminated film during blister formation to minimize stretching of the film at the base of the blister. The invention is particularly useful in manufacturing processes which involve the formation of blisters having laminated films which contain a metal foil and polymer layer, wherein improved control in the stretching of the laminate during blister formation is desirable.

9 Claims, 2 Drawing Sheets

METHOD AND APPARATUS FOR MAKING A BLISTER PACK WITH INDICIA

CROSS-REFERENCE TO RELATED APPLICATIONS

This application is a continuing application of U.S. Ser. No. 10/075,824, filed Feb. 13, 2002 and U.S. Ser. No. 10/076,038, filed Feb. 15, 2002, which are divisional applications of U.S. Ser. No. 09/549,127, filed Apr. 13, 2000, now abandoned, which is a continuation-in-part of International Application No. PCT/GB99/02589 (WO 00/09313) filed 6 Aug. 1999, which is based on and claims the benefit of priority to Great Britain Patent Application GB9817793.4 filed on 14 Aug. 1998.

FIELD OF THE INVENTION

The present invention relates to the field of packaging having blisters. In particular, the present invention relates to blister packs formed from a laminated film and having indicia embossed thereon.

BACKGROUND OF THE INVENTION

Blister films are particularly suited for the casting or molding of frangible products or dosage forms which contain certain types of pharmaceuticals. These products are commonly made using lyophilization or freeze-drying processes. Alternative techniques, such as solid state dissolution methods, are also used to produce dosage forms which are frangible as well. These processes typically involve depositing a liquid form of the product into the blister(s), and then subjecting the liquid-containing blister to various processes to form the final solid product while in the blister(s). The products remain in the blister until they are ready for use, at which time the packets are opened and the product removed therefrom.

One disadvantage associated with polymeric blister films is permeability, which creates potential storage difficulties in protecting the product from the surrounding atmosphere despite sealing efforts. Such concerns have led to the development of laminated blister films in which a metal foil is sandwiched between polymeric films on either side. These films are less permeable than purely polymeric films. However, some films become distorted when subjected to heat treatments which can generate irregularities in the molded or cast products and making subsequent handling of the blister pack more difficult. Although some laminated films that are more stable under heat treatment have been developed, such as those disclosed in European Patent Application Nos. EP 0 646 367 and 0 710 101 for example, such laminated films are not suitable for the heat-forming of blisters therein. The metal foil layer is typically made of aluminum and is well-suited for cold forming techniques.

Published International Patent Application No. WO 99/08857A1 discusses the difficulties associated with creating indicia on the base of blisters formed with laminated films containing both metal foils and polymeric layers wherein the indicia are created simultaneously with the formation of the blisters themselves.

There is a need for improved methods for preparing molded or cast products in blister packs bearing indicia, especially with blisters formed from laminated films and having indicia on the interior surface to likewise emboss the opposing surface of the cast product.

SUMMARY OF THE INVENTION

The present invention disclosed is a method for forming (or cold-forming) a blister from a laminated film and an apparatus for making such, wherein an indicia is formed on the base of the blister. In particular, the present invention involves a single pass process of combining the formation of a blister with the laminated foil and the formation of an indicia (embossing) on the blister, wherein the blister-forming pin (or punch) used, contains a face with an indicia and is adapted to controllably stretch the laminated film during blister formation. According to one embodiment of the invention, the pin face and the pin body are both adapted to controllably stretch the laminate during the advancement of the pin to form the blister. The invention is particularly useful in manufacturing processes which involve the formation of embossed blisters using laminated films which comprise a metal foil and polymer layer, wherein improved control in the stretching of the laminate during blister formation is desirable. The present invention can be used in processes wherein the product or dosage form is deposited in liquid form into the blister(s) prior to solidification and thereafter is subjected to lyophilization, freeze-drying and/or solid state dissolution processes.

Accordingly, there is disclosed herein, a method for making an embossed blister formed from a laminated film comprising forming (or cold-forming) a blister by advancing a pin having a face with indicia thereon in a transversal direction relative to the film plane towards and into engagement with a platen bearing an indicia forming dye thereon and located on the opposite side of said film, wherein the advancing movement of the pin controllably stretches (or draws) the film in a manner minimizing stretching of the film located at the base of the blister, i.e., differential stretching. Thus, the layers of the laminated film remain intact during the blister forming process.

The stretching of the laminated film from around the blister rather than from the base in initial movement of the pin is accomplished by controlling the friction between the peripheral area of the end face of the pin and the laminated film. Accordingly, the topography or molding of the pin face, the configuration of the pin body, the materials used for the pin, and combinations thereof, can be adapted or modified to control or increase the friction when contacting the laminated film surface. In a preferred embodiment, the laminated film used to form the blister comprises a metal foil and at least one polymeric layer on either side of the foil.

There is further disclosed herein an apparatus for making an embossed blister formed from a laminated film wherein said apparatus comprises:

a) a pin having a body and face portion, said face having an indicia thereon and said pin body being adapted to progressively engage the film from the pin face and comprising at least two contiguous frusto-conical portions having different apex angles;

b) a platen bearing an indicia forming dye therein and adapted to accommodate a laminated film thereon wherein said platen is in a base which is not configured to form a mold against which the laminated film is contoured; and c) means for advancing said pin towards and in engagement with said platen;

wherein said pin indicia and platen indicia are complementary and said pin is positioned transversally to said platen and adapted to controllably stretch said film to form a blister in a manner minimizing the stretching of the film located at the base of said blister.

Among the advantages associated with the invention is that embossed blisters are formed using a single step combining both blister and indicia formation simultaneously while controlling the stretching of the laminated film in the process thereby reducing the occurrence of irregularities, e.g., damaged, weakened or broken areas of the laminate.

BRIEF DESCRIPTION OF THE DRAWINGS

The instant invention is further illustrated by the drawings below in conjunction with numerical references therein which remain consistent throughout.

DETAILED DESCRIPTION OF THE INVENTION

Figure 1:
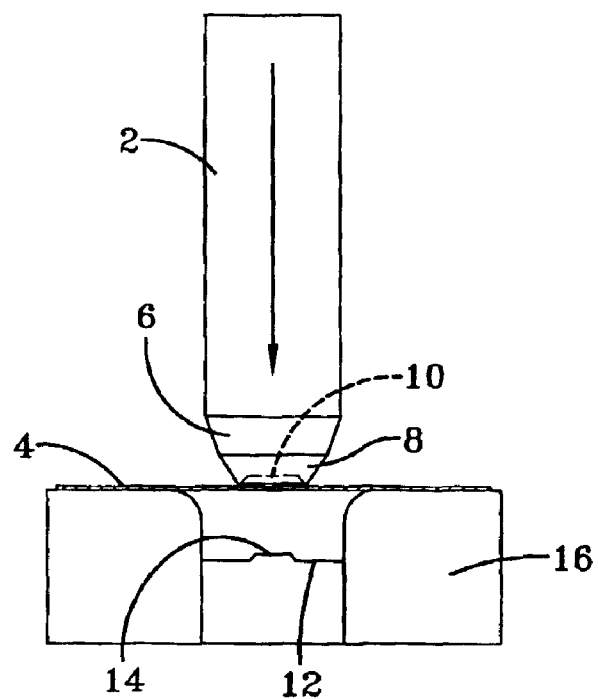
FIG. 1 is a side view perspective of a pin positioned over a laminated film and platen according to one embodiment of the invention.
Figure 2:
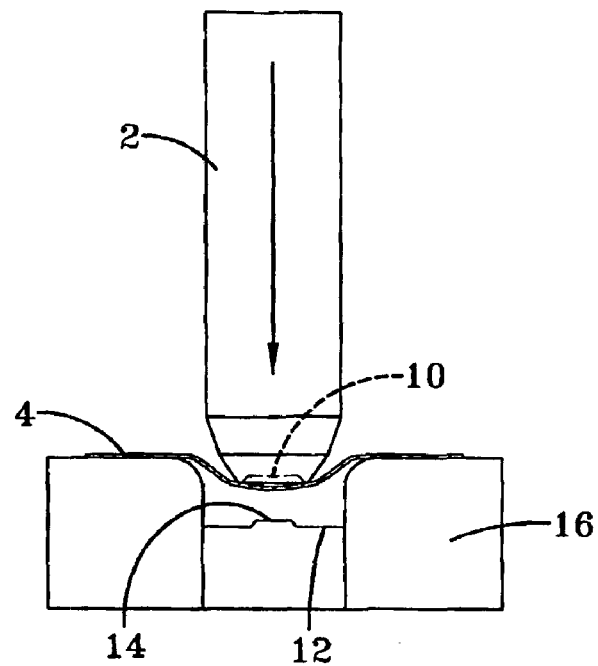
FIGS. 2, 3 and 4 together are side view perspectives of a pin positioned over a laminated film and platen according to one embodiment of the invention showing progressive sequential positions during manufacture.

The terms "product" and "dosage form" are used interchangeably herein and in the claims and are meant to indicate any delivery form of a pharmaceutical (human or veterinary) or nutritional supplement which can be produced within a blister pack.

The term "controllably stretching" and derivatives thereof when used in reference to the formation of the laminated film blister is meant to indicate that the combination of the pin structure and force exerted therewith on the laminated film during formation of the blister produces an anticipated or expected end result, e.g., minimizing the stretching of the film at the base of the blister.

The term "indicia" is meant to include any type of marking which can be applied according to the method of the present invention, such as trademarks, trade names, source and content identification, dosage amounts, and the like. Indicia can also include partition lines for halving or otherwise apportioning the product or dosage form to be contained within the blister.

The method for making an embossed blister formed from a laminated film according to the present invention comprises forming (or cold-forming) a blister by advancing a pin having a face with indicia thereon in transversal direction relative to the laminated film plane towards and into engagement with a platen bearing an indicia forming dye thereon located on the opposite side of said laminated film. The advancing movement of the pin controllably stretches (or draws) the laminated film around said platen in a manner minimizing stretching of the film located at the base of the blister, i.e., differential stretching. The movement of the pin towards the platen draws and stretches the laminated film predominantly from around the edges of the blister, thereby minimizing the stretching of the film at the base of the blister. As a result, the laminated film at the base of the blister requires less recovery time before it is again stretched to form the indicia, which can be accomplished at the end of the single pass of the punch or pin.

The stretching of the film from around the edges of the blister rather than from the base in initial movement of the pin is accomplished by controlling the friction between the peripheral area of the end face of the pin and the laminated film. Accordingly, the pin structure, i.e., topography or molding of the pin face, the configuration of the pin body, the materials used for the pin, and combinations thereof, can be adapted or modified to control or increase the friction when contacting the laminated film surface.

The topography or molding of the pin face comprises an indicia to be embossed complementary to that of the platen when engaged therewith. The pin face can further comprise a surface periphery which is substantially flat. Alternatively, the face of the pin with the indicia can be configured to be slightly concave shape whereby a peripheral edge is provided which increases the friction of the pin when contacting the laminated film.

The configuration of the pin body adjacent to the pin face can be adapted to modify the friction as well. In one embodiment, the pin body configuration can be adapted to progressively engage the film from the pin face and comprises at least two contiguous frusto-conical portions adjacent or proximal to the pin face having different apex angles relative to the pin face. In a preferred two-tiered embodiment, the pin body comprises first and second contiguous frusto-conical portions, wherein the first portion adjacent to the pin face has an apex angle of about 60° and the second portion adjacent to the first portion has an apex angle of about 30°.

The surface of the pin body can be modified to control or enhance friction between the pin and laminated film as well. In one embodiment, the pin face and pin body portion adjacent thereto can contain different materials having differing friction parameters. In a preferred embodiment, the pin body and face portions are composed of stainless steel, whereas the pin body portion adjacent to the face is coated with PTFE (polytetrafluoroethylene or Teflon®).

Laminated films suitable for use with the invention can be any film which can form a blister and retain an embossed indicia thereon and which can respond to controlled stretching of the film during the formation of the blister. Preferably, the laminated films used in conjunction with the method and apparatus of the invention are those which contain a metal foil and at least one polymeric layer on either side of the foil.

Metal foils in the laminated film can be composed of any metal or metallic alloy which can be formed into a foil having physical and chemical properties (e.g., thickness, malleability, temperature resistance and chemical compatibility) sufficient to adhere to a polymeric layer and remain intact during blister formation. Preferably, the metal foil is composed of aluminum.

The polymeric layer or layers suitable for use in the laminated film can include those materials well known in the art for use in the production of blisters and blister packs, including but not limited to, PVC (polyvinylchloride).

Specific laminated films which can be used with the present invention include those described in European Patent Application Nos. EP 0 647 367 and 0 710 101, the entire text of which are incorporated herein by reference.

The platen bears an indicia forming die thereon and is positioned or located on the opposite side of said laminated film from the pin and is configured to accommodate the pin and laminated film in the manner necessary to form the embossed blister. The platen can be composed of any well known material in the art for blister production which can withstand the forces exerted upon it during the blister-forming process. Materials which can be used include, but are not limited to, metals and metallic alloys such as stainless steel and titanium. The platen bearing an indicia forming die is in a base which is not configured to form a mold against which the laminated film is contoured.

FIGS. 1 through 4 depict the components of the pin and platen assembly and the laminated film running therethrough. Collectively, FIGS. 1 through 4 illustrate the progressive stages of the method according to the present invention. FIG. 1 shows a pin 2 positioned over a laminated film 4. Towards the lower end of the pin 2 and adjacent to the pin end face 10 are two contiguous first and second frusto-conical portions (or flanks), 8 and 6 respectively, in a gradient. The pin face 10 contains an indicia (not shown) to be embossed into the base of the blister when engaged with the platen 12 having the indicia forming die 14. The indicia molded on the pin face 10 and platen die 14 are complementary.

Figure 3:
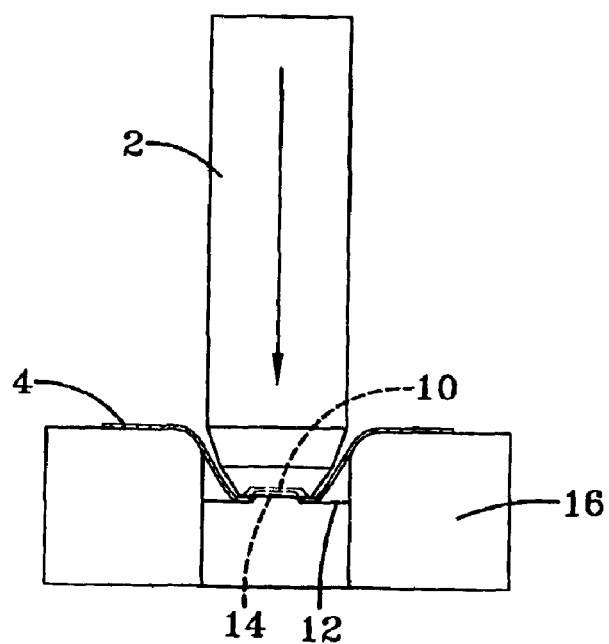

The platen 12 is adapted to accommodate a laminated film 4 which is positioned, clamped or otherwise secured such that the film covers the platen 12 using conventional techniques. Now referring to FIG. 2, the pin 2 advances against the film 4 towards the platen bearing an indicia forming die 14 thereon. During the initial stage of the method, the stretching is relatively uniform with the periphery of the pin face 10 making contact with the film 4 under progressively greater pressure. Thus, the pin progressively engages the film from the face of the pin onward. Thus, as the pin advances to its final position as shown in FIG. 3, the stretching at the base of the blister is minimized with the film being stretched from the areas around the blister.

Consequently, the indicia is formed in the base of the blister concurrently with the formation of the blister per se during the final movement of the pin 2 against the platen 12. Typically, the indicia is formed within about the last millimeter of movement, more typically within the last 0.3 mm to about 0.5 mm, depending upon the dimensions of the indicia desired.

Figure 4:
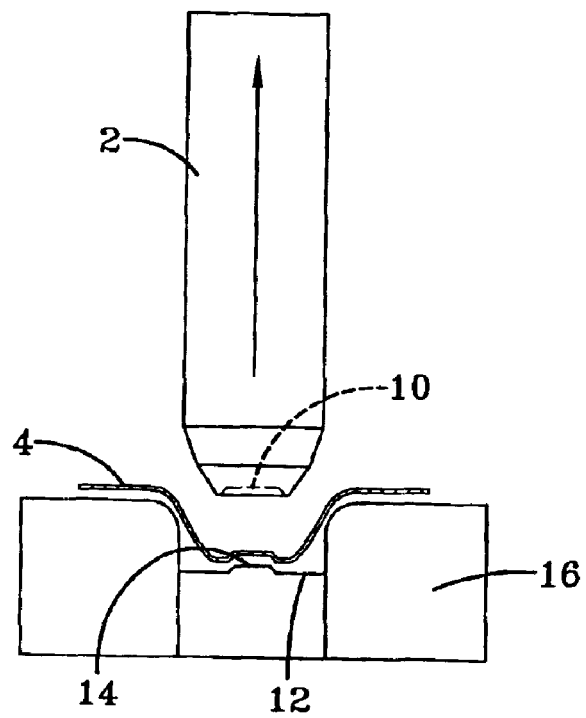

FIG. 4 shows the pin 2 being withdrawn and illustrates the resilient response of the laminated film 4 arising from the platen 12 and base 16 which defines the recess in which the blister is created. The base 16 itself is not configured to form a mold against which the laminate film is contoured. Thus, the pin 2 determines the entire shape of the blister itself, with only the indicia being formed from contact on both sides.

Following the blister formation process, the blisters are then filled with a product or dosage form, sealed and packaged. In the production of product the blisters can be filled with a liquid form of the product or formulation which is subsequently solidified, thereby producing a product or dosage form embossed with the corresponding indicia found on the base interior of the blister.

The present invention is particularly suited for the production of frangible products or dosage forms wherein blister packs are the preferred packaging system. Such products include those which are prepared from formulations which are lyophilized, freeze-dried or subjected to solid state dissolution. Accordingly, liquid formulations can be deposited directly into the blister units, freeze-dried, sealed and packaged. Blister packs formed in accordance with the present invention can comprise a single blister having one dosage unit therein or alternatively multiple blisters with multiple units therein.

The apparatus for making an embossed blister formed from a laminated film according to the invention comprises:
  a) a pin having a body and face portion, said face having an indicia thereon and said pin body being adapted to progressively engage the film from the pin face and comprising at least two contiguous frusto-conical portions having different apex angles;
  b) a platen bearing an indicia forming dye therein and adapted to accommodate a laminated film thereon wherein said platen is in a base which is not configured to form a mold against which the laminated film is contoured; and
  c) means for advancing said pin towards and in engagement with said platen;

wherein said pin indicia and platen indicia are complementary and said pin is positioned transversally to said platen and adapted to controllably stretch said film to form a blister in a manner minimizing the stretching of the film located at the base of said blister.

The pin component of the apparatus comprises a body portion and a face portion having an indicia complementary to the indicia located on the platen die. The body of the pin can be composed of any rigid material available in the art for the purpose of making blisters, including but not limited to, stainless steel. Typically, the pin has an overall cylindrical configuration, although modifications in shape to produce particular blister dimensions can be made. For example, the pin body can be varied in diameter to produce larger or smaller blisters therewith.

The pin structure, i.e., topography or molding of the pin face, the configuration of the pin body, the materials used for the pin, and combinations thereof, can be adapted or modified to control or increase the friction between the pin and the laminated film surface so as to stretch the film from around the edges of the blister rather than from the base of the blister during the initial movement of the pin.

The pin face can comprise a surface periphery which is substantially flat. Alternatively, the face of the pin can be slightly concave whereby a peripheral edge is provided which increases the friction of the pin when contacting the laminated film.

The configuration of the pin body adjacent to the pin face is adapted to progressively engage the film from the pin face and comprises at least two contiguous frusto-conical portions having different apex angles relative to the pin face. In a preferred two-tiered embodiment, the pin body comprises first and second contiguous frusto-conical portions, wherein the first portion adjacent to the pin face has an apex angle of about 60° and the second portion adjacent to the first portion has an apex angle of about 30°.

The portion of the pin body adjacent to the face and pin face can also comprise different materials having differing friction parameters. In a preferred embodiment, the pin body and face portions are composed of stainless steel, whereas the pin body portion adjacent to the face is coated with PTFE (polytetrafluoroethylene).

The pin structure can comprise combinations of friction controlling features as well. In one embodiment of the invention, the pin body comprises both two contiguous frusto-conical portions adjacent to the face having different apex angles relative to the pin face and a surface with materials having differing friction parameters on the pin body.

The platen bears an indicia forming die thereon and is positioned or located in a base on the opposite side of said film from the pin when the film is loaded onto the apparatus and is configured to accommodate the pin and film in the manner necessary to form the embossed blister. The platen can be composed of any well known material in the art for blister production and embossing which can withstand the forces exerted upon it during the blister-forming process. Typical materials which can be used include, but are not limited to, metals and metallic alloys such as stainless steel and titanium. The platen and base are adapted to accommodate a laminated film, e.g., position, clamp or otherwise secure the film, such that the film covers the platen. The platen bearing an indicia forming die is in a base which is not configured to form a mold against which the laminated film is contoured.

The means for advancing the pin towards the platen used in the apparatus can be any conventional mechanical device or apparatus that can move the pin towards the laminated film and exert the force necessary to form a blister from the laminated film.

The configuration of the pin face and pin body adjacent or proximal thereto, produce the shape of the blister formed. A variety of shapes and configurations of blisters are possible by modifying the overall configuration of the pin body to produce the desired shape. For example, the diameter of a cylindrical pin can be adjusted to produce smaller or larger blister sizes.

Also, a variety of indicia can be applied to blisters and consequently the product by modifying the pin face mold and the die. Examples of indicia which can be applied to blisters according to the present invention include trademarks, trade names, source and content identification, dosage amounts, partitions, and the like.

INDUSTRIAL APPLICABILITY

The present invention is useful in the packaging industry for the manufacture of blister packs for a variety of products, including pharmaceuticals. In particular, the invention can be used in the preparation and packaging of frangible products using laminated films wherein improvements in the formation of blisters and the creation of indicia on both the blister and product are desired.

The present invention has been described with reference to various specific and preferred embodiments and techniques. However, it should be understood that reasonable variations and modifications are possible from the foregoing disclosure without departing from either the spirit or scope of the present invention as defined by the claims.

I claim:

1. A method for making an embossed blister formed from a laminated film comprising forming a blister by advancing a pin having a face with an indicia thereon in transversal direction relative to the film plane towards and into engagement with a platen bearing an indicia forming die thereon and located on the opposite side of said film wherein said advancing movement of the pin controllably stretches the film around the blister in a manner minimizing stretching of the film located at the base of the blister.

2. The method according to claim 1 wherein the method for making an embossed blister from a laminated film is a cold forming method.

3. The method according to claim 1 wherein the laminated film comprises a metal foil and at least one polymeric layer on either side of said foil.

4. The method according to claim 3 wherein the metal foil is composed of aluminum.

5. The method according to claim 1 wherein the pin face comprises a slightly concave surface having a peripheral edge.

6. The method according to claim 1 wherein the pin body is adapted to progressively engage the film and comprises at least two contiguous frusto-conical portions adjacent to the pin face having different apex angles in a gradient.

7. The method according to claim 1 wherein the portion of the pin body adjacent to the pin face and the pin face itself comprise different materials having differing friction parameters.

8. The method according to claim 1 wherein the platen bearing an indicia forming die is located in a base which is not configured to form a mold against which the laminated film is contoured.

9. A method for making an embossed blister formed from a laminated film comprising forming a blister by advancing a pin having a face with an indicia thereon in a transversal direction relative to the film plane towards and into engagement with a platen bearing an indicia forming die thereon located on the opposite side of said film wherein said pin face has a slightly concave surface and peripheral edge, and the pin body is adapted to progressively engage the film and comprises at least two contiguous frusto-conical portions adjacent to the pin face having different apex angles; and wherein said advancing movement of the pin controllably stretches the film around the blister in a manner minimizing stretching of the film located at the base of the blister.

* * * * *